June 23, 1931. E. A. SPENCER 1,811,248
PISTON RING CLAMP
Filed May 10, 1930
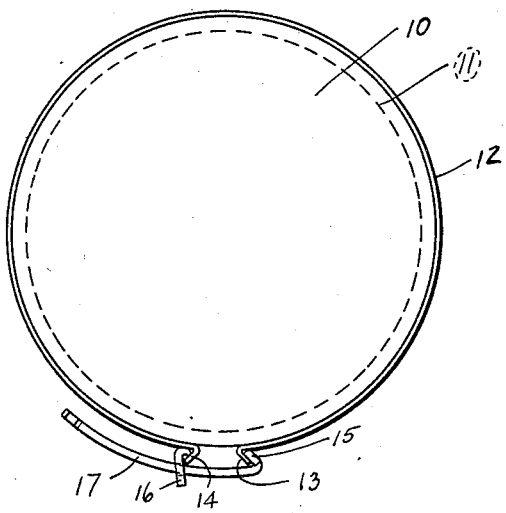
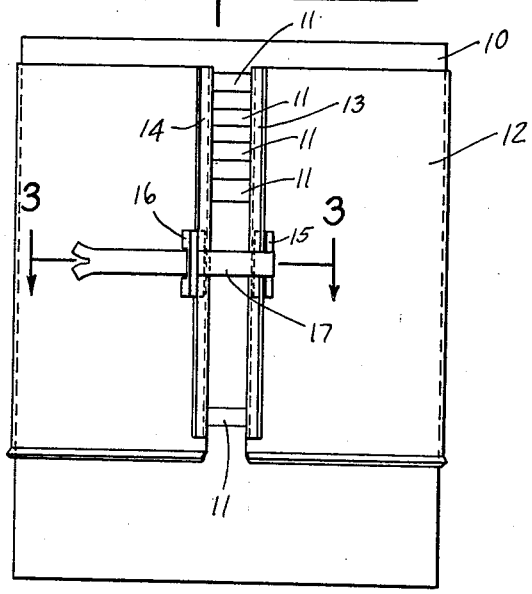
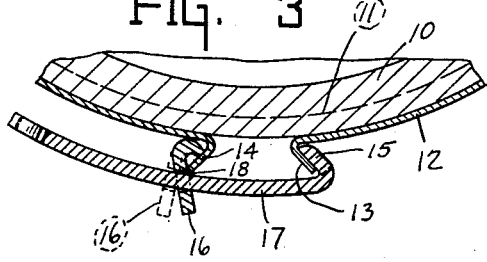
INVENTOR.
ELMER A. SPENCER.
BY
Lockwood Lockwood Goldsmith & Galt
ATTORNEYS.

Patented June 23, 1931

1,811,248

UNITED STATES PATENT OFFICE

ELMER A. SPENCER, OF ST. LOUIS, MISSOURI, ASSIGNOR TO RAMSEY ACCESSORIES MANUFACTURING CORPORATION, OF ST. LOUIS, MISSOURI

PISTON RING CLAMP

Application filed May 10, 1930. Serial No. 451,267.

This invention relates to a piston ring clamp for use in clamping and locking in clamped position the piston rings in their respective grooves on the piston so as to hold them in place while the piston is being inserted in the cylinder.

The principal object of the invention is to provide a simplified and economical lock for the clamping sleeve after having been compressed to clamping position.

The principal feature of the invention resides in the provision of a pair of hook-like members adapted to hook over the exposed flanged edges of the clamping sleeve, one of said members being provided with a curved strap adapted to slidably extend through an opening in the other member which is formed at such an angle with respect to the curve of the arm as to freely slide thereon when the edges of the sleeve are pulled together for clamping purposes, and interlock therewith against movement in the reverse direction so as to hold said sleeve in clamping position.

The full nature of the invention will be understood from the accompanying drawings and the following description and claims.

Fig. 1 is a top plan view of a piston showing the sleeve locked in clamping position thereon. Fig. 2 is the same as Fig. 1 showing a front elevation thereof. Fig. 3 is an enlarged section taken on the line 3—3 of Fig. 2.

In the drawings there is illustrated a piston 10 provided with the usual piston rings 11 about which there is adapted to be secured a clamping sleeve 12 for securing the rings in compressed position while inserting the piston in a cylinder.

The compressing sleeve 12 is split longitudinally in the usual manner, and provided at its adjacent free edges with the outwardly and reversely bent flanges 13 and 14. Any suitable means may be employed for forcing the sleeve into clamping position, wherein it is desired to releasably lock it.

For releasably locking the sleeve in compressing position there is provided a pair of hook-like members 15 and 16 adapted to hook about the flanges 13 and 14, respectively. The member 15 is provided with a strap 17 formed integral therewith, which strap has substantially the curvature of the sleeve when in clamping position and is adapted to extend over the gap between the free edges thereof. The hook-like member 16 is provided with an opening 18 through which the strap is free to slide when said member extends substantially radially of the piston and curvature of the strap, as illustrated by dotted lines in Fig. 3. When, however, said member is moved to an angular position as illustrated in full lines in Fig. 3, the edges of the opening 18 interlock with the surface of the strap and cause a wedging action such as to prevent the relative movement between the strap and said member, whereby the sleeve will be securely locked in its clamping position.

In use, after the sleeve has been pulled to clamping position with the hook-like members engaged with the flanged edges thereof, by merely moving the member 16 into the position shown in full lines in Fig. 3, the sleeve will be securely locked in such position. When it is desired to unlock and remove the sleeve, the member 16 may be moved to the position shown in dotted lines in Fig. 3 whereupon the strap 17 will be released and the sleeve unlocked for removal from the piston.

The invention claimed is:

1. The combination with a split piston ring compressing sleeve, of means for locking said sleeve in compressed position comprising an apertured member locked with said sleeve adjacent one free edge thereof while movable relative thereto, and a strap having substantially the curvature of said sleeve with one end secured adjacent the other free edge thereof and extending through the aperture in said member, said strap being adapted to freely slide through said member when in one position and interlock therewith through a wedging action when in another position.

2. The combination with a split piston ring compressing sleeve, of means for locking said sleeve in compressed position, an apertured member secured adjacent one free edge of the sleeve, and a second member secured adjacent the opposite free edge thereof and provided with a strap extending through the aperture in said first-mentioned member, said strap having substantially the curvature of the sleeve when in clamping position, whereby said strap will be free to slide through the aperture when the apertured member extends substantially radially with respect to the curvature thereof, and interlocking therewith through a wedging action when it is drawn to an angular relation by the tension of the sleeve when in compressed position, whereby said sleeve will be locked subject to release by moving the apertured member from its angular to its radial position.

3. The combination with a split piston ring compressing sleeve, of means for locking said sleeve in compressed position comprising an outwardly and reversely bent flange formed on the adjacent edges of said sleeve, a hook-like apertured member adapted to hook over one of said flanges, and a second hook-like member adapted to hook over the other flange and provided with a strap extending through the aperture in said first-mentioned member, said strap having substantially the curvature of the sleeve when in clamping position, whereby said strap will be free to slide through the aperture when the apertured member extends substantially radially with respect to the curvature thereof, and interlock therewith through a wedging action when it is drawn to an angular relation by the tension of the sleeve in compressed position, whereby said sleeve will be locked subject to release by moving the apertured member from its angular to its radial position.

In witness whereof, I have hereunto affixed my signature.

ELMER A. SPENCER.